(12) United States Patent
Komada et al.

(10) Patent No.: US 7,517,605 B2
(45) Date of Patent: Apr. 14, 2009

(54) SOLID OXIDE FUEL CELL AND SEPARATOR

(75) Inventors: Norikazu Komada, Naka-gun (JP); Koji Hoshino, Naka-gun (JP); Jun Akikusa, Naka-gun (JP); Kei Hosoi, Naka-gun (JP)

(73) Assignees: Mitsubishi Materials Corporation, Tokyo (JP); Kansai Electric Power Co., Inc., Osaka (JP)

( * ) Notice: Subject to any disclaimer, the term of this patent is extended or adjusted under 35 U.S.C. 154(b) by 0 days.

(21) Appl. No.: 11/634,143

(22) Filed: Dec. 6, 2006

(65) Prior Publication Data

US 2007/0092775 A1   Apr. 26, 2007

Related U.S. Application Data

(62) Division of application No. 10/506,526, filed on Sep. 3, 2004, now Pat. No. 7,201,991.

(51) Int. Cl.
*H01M 2/00*   (2006.01)

(52) U.S. Cl. .............................. 429/34; 429/35; 429/38; 429/39

(58) Field of Classification Search ........................ None
See application file for complete search history.

(56) References Cited

U.S. PATENT DOCUMENTS

| | | | | |
|---|---|---|---|---|
| 5,578,388 | A | * | 11/1996 | Faita et al. ..................... 429/30 |
| 5,691,075 | A | * | 11/1997 | Batawi ........................ 429/32 |
| 2002/0172849 | A1 | | 11/2002 | Fan et al. |

FOREIGN PATENT DOCUMENTS

| | | |
|---|---|---|
| JP | 2-129857 | 5/1990 |
| JP | 3-225767 | 10/1991 |
| JP | 4-63562 | 5/1992 |
| JP | 5-166523 | 7/1993 |
| JP | 7-45289 | 2/1995 |
| JP | 7-153469 | 6/1995 |
| JP | 2001-307754 | * 11/2001 |
| JP | 2002-8682 | 1/2002 |

* cited by examiner

*Primary Examiner*—Patrick Ryan
*Assistant Examiner*—Cynthia Lee
(74) *Attorney, Agent, or Firm*—Wenderoth, Lind & Ponack, L.L.P.

(57) ABSTRACT

A solid oxide fuel cell is formed by arranging a fuel electrode layer and an air electrode layer on both surfaces of a solid electrolyte, respectively, a fuel electrode current collector and an air electrode current collector outside the fuel electrode layer and the air electrode layer, respectively, and separators outside the fuel electrode current collector and the air electrode current collector. In a first embodiment, a fuel gas and an oxidant gas are supplied from the separators to the fuel electrode layer and the oxidant electrode layer, respectively, through the fuel electrode current collector and the air electrode current collector, respectively. Each separator is formed by laminating a plurality of thin metal plates at least including a thin metal plate in which a first gas discharge opening is arranged in a central part and second gas discharge openings are circularly arranged in a peripheral part, and a thin metal plate with an indented surface. Gases discharged from the separators can be supplied to entire areas of the electrode layers through the current collectors, so that electric power generation can be performed.

3 Claims, 5 Drawing Sheets

FIG. 7
(PRIOR ART)
FIG. 8
(PRIOR ART)
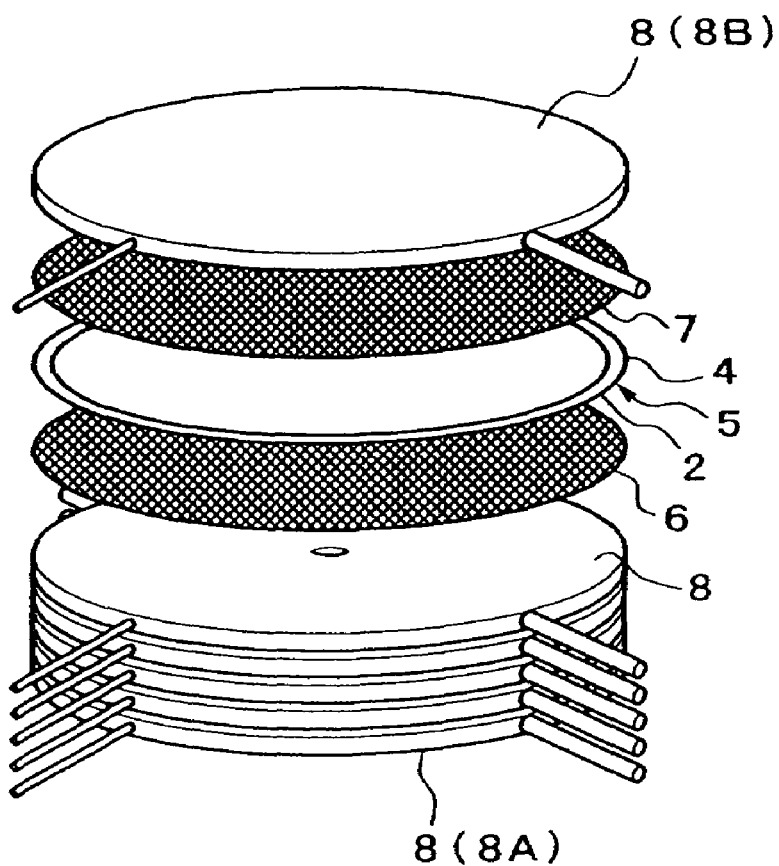
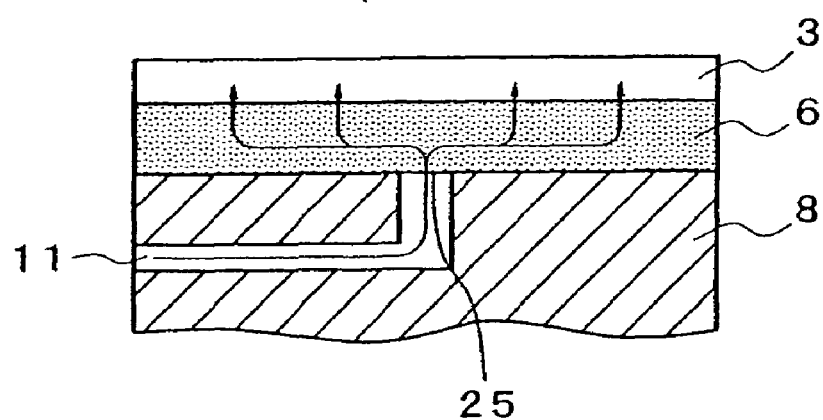

SOLID OXIDE FUEL CELL AND SEPARATOR

This application is a divisional of U.S. application Ser. No. 10/506,526, filed Sep. 3, 2004 now U.S. Pat. No. 7,201,991.

TECHNICAL FIELD

The present invention relates to a solid oxide fuel cell, more specifically to a separator in a planar solid oxide fuel cell in which introduced gas is supplied to an entire area of a current collector to thereby equalize an imbalance in an electrode reaction, and an improvement of electric power generation efficiency is achieved.

BACKGROUND ART

Development of a solid oxide fuel cell, having a laminate structure in which a solid electrolyte layer made of an oxide ion conductor is sandwiched between an air electrode layer (oxidant electrode layer) and a fuel electrode layer, is progressing as third-generation fuel cell for use in electric power generation. In a solid oxide fuel cell, oxygen (air) is supplied to an air electrode section and a fuel gas ($H_2$, CO and the like) is supplied to a fuel electrode section. An air electrode and a fuel electrode are both made to be porous so that gases can reach interfaces in contact with the solid electrolyte layer.

Oxygen supplied to an air electrode section passes through pores in the air electrode layer and reaches a neighborhood of the interface in contact with the solid electrolyte layer, and in that portion, the oxygen receives electrons from the air electrode to be ionized into oxide ions ($O^{2-}$). These generated oxide ions move in the solid electrolyte layer by diffusion toward the fuel electrode. The oxide ions having reached the neighborhood of the interface in contact with the fuel electrode react with fuel gas in that portion to produce reaction products ($H_2O$, $CO_2$ and the like), and release electrons to the fuel electrode.

The electrode reaction when hydrogen is used as fuel is as follows:

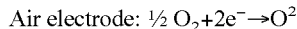
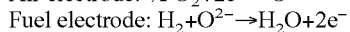
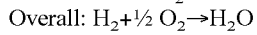

Air electrode: $\frac{1}{2} O_2 + 2e^- \rightarrow O^{2-}$
Fuel electrode: $H_2 + O^{2-} \rightarrow H_2O + 2e^-$
Overall: $H_2 + \frac{1}{2} O_2 \rightarrow H_2O$ Because the solid electrolyte layer is a medium for migration of the oxide ions and also functions as a partition wall for preventing direct contact of the fuel gas with air, the solid electrolyte layer has a dense structure capable of blocking gas permeation. It is required that the solid electrolyte layer has high oxide ion conductivity, and is chemically stable and strong against thermal shock under conditions involving an oxidative atmosphere in the air electrode section and a reductive atmosphere in a fuel electrode section. As a material which can meet such requirements, generally a stabilized zirconia (YSZ) that is added with yttria is used.

On the other hand, the air electrode (cathode) layer and fuel electrode (anode) layer need to be formed of materials having high electronic conductivity. Because an air electrode material is required to be chemically stable in an oxidative atmosphere of high temperatures around 700° C., metals are unsuitable for the air electrode, and generally used are perovskite type oxide materials having electronic conductivity, specifically $LaMnO_3$ or $LaCoO_3$, or solid solutions in which part of an La component in these materials is replaced with Sr, Ca and the like. Moreover, the fuel electrode material is generally a metal such as Ni or Co, or a cermet such as Ni—YSZ or Co—YSZ.

A solid oxide fuel cell is classified into a high temperature operation type operated at high temperatures around 1000° C., and a low temperature operation type operated at low temperatures around 700° C. A solid oxide fuel cell of the low temperature operation type uses an electric power generation cell which is improved to work as a fuel cell even at low temperatures by lowering a resistance of an electrolyte, for example, through making the electrolyte made of an yttria stabilized zirconia (YSZ), be a thin film on the order of 10 μm in thickness.

A solid oxide fuel cell operable at high temperature is used for the separator, for example, a ceramic having electronic conductivity such as lanthanum chromite ($LaCrO_3$), while a solid oxide fuel cell of a low temperature operation type can be used for the separator, i.e. a metallic material such as stainless steel.

Additionally, as structure of the solid oxide fuel cell, there have been proposed three types, namely, a cylindrical type, a monolithic type and a flat plate type.

A stack of a solid oxide fuel cell has a structure in which electric power generation cells, current collectors and separators are alternately laminated. A pair of separators sandwich an electric power generation cell from both sides of the cell in such a way that one of the separators is in contact with the air electrode through intermediary of an air electrode current collector, while the other separator is in contact with the fuel electrode through intermediary of a fuel electrode current collector. For the fuel electrode current collector, a spongy porous substance made of a Ni based alloy or the like can be used, while also for the air electrode current collector, a spongy porous substance made of a Ag based alloy or the like can be used. A spongy porous substance simultaneously displays a current collection function, gas permeation function, uniform gas diffusion function, cushion function, thermal expansion difference absorption function and the like, and is accordingly suitable for a multifunction current collector.

The separators electrically connect between electric power generation cells, and also have a function to supply gas to the electric power generation cells. Therefore, each separator has a fuel path through which fuel gas is introduced from a peripheral side of the separator and is discharged from a separator surface facing the fuel electrode layer, and an oxidant path through which oxidant gas is introduced from the peripheral side of the separator and is discharged from a separator surface facing the oxidant electrode layer.

<Problems to be Solved by the Invention>
<First Problem>

In a case of the solid oxide fuel cell of the low temperature operation type, metal (stainless steel or the like) plates on the order of 5 to 10 mm in thickness are used for the separators, and there has hitherto been known a separator having a structure such that gas discharge openings, to discharge fuel gas and oxidant gas introduced from the peripheral side of the separator into the current collector, are provided in a central part of the separator.

FIG. 8 is a sectional view of a relevant portion of a fuel cell stack illustrating an example of the above described separator. In FIG. 8, reference numeral 3 denotes a fuel electrode layer, reference numeral 6 denotes a fuel electrode current collector, reference numeral 8 denotes a separator, reference numeral 11 denotes a fuel path, reference numeral 25 denotes a gas discharge opening, and arrows indicate a gas permeation condition.

Here, it should be noted that such a conventional separator structure as described above is associated with the following problems.

More specifically, the structure is such that fuel gas discharged from the central part of the separator 8 is supplied to an entire area of the fuel electrode layer 3 through the fuel electrode current collector 6 made of a porous cushioning material; however, in practice, there is a problem in that the fuel gas is consumed to a large extent by an electrode reaction in a neighborhood of the gas discharge opening 25, and hence a gas concentration is decreased with increasing distance away from the gas discharge opening 25. Consequently, the electrode reaction is not uniformly conducted over the entire area of the electrode, a temperature gradient is thereby generated in the electric power generation cell, the electric power generation cell is sometimes broken down by thermal stress thus generated, and a resulting inefficient electric power generation leads to degradation of electric power generation properties (electricity production comes to be large in a central part of the electric power generation cell and small in a peripheral part of the same cell) . This problem has been particularly conspicuous in the fuel electrode section.

Additionally, use of thick metallic plates of 5 to 10 mm in thickness makes a weight of a single cell itself great, and accordingly, in a case of a solid oxide fuel cell constructed by longitudinally arranging cell stacks, there is a problem such that the electric power generation cells in the cell stacks located in a bottom portion tend to be broken by a weight of the fuel cell. Consequently, as affairs stand, there remains a problem in that a cell configuration is inevitably constrained in such a way that a number of laminations is consistent with a tolerable weight of the fuel cell. Incidentally, in a case of a conventional structure, a weight of a cell stack is about 1 kg, and a total weight of a cell module made by laminating a large number of these cell stacks comes to be about 25 kg. Consequently, a structure supporting such a module is naturally complex.

<Second Problem>

As described above, in a conventional solid oxide fuel cell, each of the current collectors made of a porous cushioning material is arranged between an electrode layer and a separator, and gas is distributed to be supplied to each of the electrode layers through the current collectors; however, there has been a problem in that in the conventional structure, a retaining time of the gas in a current collector is short, and consequently fuel gas not engaging with the electrode reaction is discharged outside the electric power generation cell, so that electric power generation efficiency is thereby degraded.

Additionally, in the conventional structure, a linear velocity of gas in the peripheral part of the electric power generation cell comes to be low. Consequently, there has also been a problem in that from the peripheral part of the electric power generation cell, air as oxidant is taken into an interior of the electric power generation cell, where a combustion reaction tends to take place, the combustion reaction completely consumes the fuel gas to be usable for the electrode reaction, and consequently electric power generation efficiency is degraded.

Such an adverse phenomenon has remarkably taken place particularly in a fuel cell stack provided with separators having a structure in which fuel gas or oxidant gas is supplied to the fuel cell electrode current collector or the oxidant electrode current collector from a central part of each separator.

SUMMARY OF THE INVENTION

In view of the above described problems, a first object of the present invention is provision of a planar solid oxide fuel cell in which electric power generation efficiency is improved by uniformizing an electrode reaction in current collectors, and adverse effects such as breakdown accidents are prevented by making separators light in weight, and provision of a separator for use in the solid oxide fuel cell.

More specifically, the present invention according to a first aspect is a planar solid oxide fuel cell in which a fuel electrode layer and an oxidant electrode layer are arranged on both surfaces of a solid electrolyte layer, respectively; a fuel electrode current collector and an oxidant electrode current collector are arranged outside the fuel electrode layer and the oxidant electrode layer, respectively; respective separators are arranged outside the fuel electrode current collector and the oxidant electrode current collector; and a fuel gas and an oxidant gas are supplied from the respective separators to the fuel electrode layer and the oxidant electrode layer respectively, through the fuel electrode current collector and the oxidant electrode current collector, respectively, with the fuel cell being characterized in that each of the separators includes a first gas discharge opening for discharging introduced gas from a central part of the separator and a plurality of second gas discharge openings for discharging the introduced gas along a peripheral part of the separator in a circular manner.

In the configuration described above, the gas is discharged from the central part of each separator and is discharged in a circular manner from the peripheral part of each separator. Accordingly, the gas can be sufficiently supplied to and distributed over entire areas of the current collectors. Consequently, electrode reactions are caused to be performed uniformly all over entire areas of the electrodes; thus efficient electric power generation can be performed in which a difference in electricity production between central parts and peripheral parts is eliminated.

Additionally, the present invention according to a second aspect is characterized in that in the planar solid oxide fuel cell according to the first aspect, each separator is made by laminating a plurality of thin metal plates at least including a thin metal plate provided with the first gas discharge opening and the second gas discharge openings, and a thin metal plate with a worked indented surface.

According to the above described configuration, the separators themselves can be made light in weight, concavities and convexities of the thin metal plates form gas flow paths, and hence introduced gas is diffused uniformly over entire areas of the separators, so that ensured is gas supply to the first gas discharge opening as a matter of course and also to the second gas discharge openings formed in peripheral parts in a circular manner.

Additionally, the present invention according to a third aspect is a planar solid oxide fuel cell according to the second aspect, characterized in that the thin metal plate provided with the first gas discharge opening and the second gas discharge openings is arranged at least on a side of each of the fuel electrode current collectors.

Nonuniformity of an electrode reaction in the current collectors is conspicuous around portions where supplied gas enters. This is ascribable to the fact that in contrast to air (an oxidant gas), fuel gas cannot be supplied in a large amount, so that a supply amount is restricted. Accordingly, in the present configuration, such gas discharge structure as described above is applied at least to separator portions in contact with the fuel electrode current collectors, so that nonuniformity of an electrode reaction in the fuel electrode layers is reduced.

Additionally, the present invention according to a fourth aspect is a separator for use in a solid oxide fuel cell which is contacted with each current collector arranged outside each electrode to form a gas passage for supplying a gas to the electrode, characterized in that the separator includes a first gas discharge opening for discharging an introduced gas from a central part thereof and a plurality of second gas discharge openings for discharging the gas along a peripheral part thereof in a circular manner.

Additionally, the present invention according to a fifth aspect is the separator for use in a solid oxide fuel cell according to the fourth aspect, characterized in that the separator is made by laminating a plurality of thin metal plates including at least the thin metal plate provided with the first gas discharge opening and the second gas discharge openings, and a thin metal plate having a worked indented surface.

Additionally, the present invention according to a sixth aspect is the separator for use in a solid oxide fuel cell according to the fifth aspect, characterized in that the thin metal plate provided with the first gas discharge opening and the second gas discharge openings is arranged at least on a side of the fuel electrode current collector.

Furthermore, in view of the above described problems involved in conventional techniques, another object of the present invention is provision of a solid oxide fuel cell in which electric power generation efficiency is improved by increasing utilization ratios of fuel gas and oxidant gas in current collectors, and provision of a separator for use in the solid oxide fuel cell.

More specifically, the invention according to a seventh aspect is a solid oxide fuel cell in which a fuel electrode layer and an oxidant electrode layer are arranged on both surfaces of a solid electrolyte layer, respectively; a fuel electrode current collector and an oxidant electrode current collector, with both collectors being formed of a porous substance, are arranged outside the fuel electrode layer and the oxidant electrode layer, respectively; respective separators are arranged outside the fuel electrode current collector and the oxidant electrode current collector; and a fuel gas and an oxidant gas are supplied from the respective separators to the fuel electrode layer and the oxidant electrode layer, respectively, through the fuel electrode current collector and the oxidant electrode current collector, respectively; with the fuel cell being characterized in that indents are formed on a surface of each of the separators, which surface is in contact with each of the current collectors, to increase a dwell volume of gas in the current collectors.

In the above described configuration, the current collectors made of a spongy porous substance each are expanded in conformity with a depression of an associated separator, and hence volumes of the separators are increased, so that a retaining time of the gas is elongated (a gas permeation rate is made lower) if a supplied amount of the gas is constant. In this way, a reaction between gases and the electrode layers comes to be conducted satisfactorily, and electric power generation efficiency is thereby improved.

Additionally, the invention according to an eighth aspect is a solid oxide fuel cell in which a fuel electrode layer and an oxidant electrode layer are arranged on both surfaces of a solid electrolyte layer, respectively; a fuel electrode current collector and an oxidant electrode current collector, with both collectors being formed of a porous substance, are arranged outside the fuel electrode layer and the oxidant electrode layer, respectively; respective separators are arranged outside the fuel electrode current collector and the oxidant electrode current collector; and a fuel gas and an oxidant gas are supplied from the respective separators to the fuel electrode layer and the oxidant electrode layer, respectively through the fuel electrode current collector and the oxidant electrode current collector, respectively; with the fuel cell being characterized in that a peripheral part of a surface of each of the separators, which surface is in contact with each of the current collectors, is protruded expandably to increase linear velocities of gases in peripheral parts of the current collectors.

An increase of the linear velocity of the gas being discharged in the peripheral parts prevents air entrained from the peripheral parts, and in particular, in peripheral parts of the fuel electrode layers, can maintain a fuel gas concentration in an elevated concentration condition, and electric power generation performance is thereby improved.

Additionally, the invention according to a ninth aspect is a solid oxide fuel cell in which a fuel electrode layer and an oxidant electrode layer are arranged on both surfaces of a solid electrolyte layer, respectively; a fuel electrode current collector and an oxidant electrode current collector, with both collectors being formed of a porous substance, are arranged outside the fuel electrode layer and the oxidant electrode layer, respectively; respective separators are arranged outside the fuel electrode current collector and the oxidant electrode current collector; and a fuel gas and an oxidant gas are supplied from the respective separators to the fuel electrode layer and the oxidant electrode layer, respectively, through the fuel electrode current collector and the oxidant electrode current collector, respectively; with the fuel cell being characterized in that indents are provided on a surface of each of the separators, which surface is in contact with each of the current collectors, and a peripheral part of the separator is protruded expandably.

In the above described configuration, a gas permeation rate in the interior of the current collectors is made low and electrode reactions are made satisfactory, and a linear velocity of gas in peripheral parts is made large, and entrainment of air from peripheral parts can thereby be prevented. Consequently, electric power generation performance can be improved.

Additionally, the present invention according to a tenth aspect is the solid oxide fuel cell according to any one of the seventh to ninth aspects, characterized in that a surface shape of the separators is formed at least on surfaces in contact with the current collectors.

A phenomenon of an incomplete reaction of gas in an interior of the current collectors takes place on portions where supplied fuel gas enters. This is ascribable to the fact that in contrast to air (an oxidant gas), the fuel gas cannot be supplied in large amount, so that a supply amount thereof is restricted. Accordingly, in the present configuration, depressions and protruded portions are provided at least on the surface, in contact with one of the fuel electrode current collectors, of each of the separators, and the phenomenon of the incomplete reaction of the gas and a phenomenon of entrainment of air in the fuel electrode current collector are thereby remedied.

Additionally, the invention according to an eleventh aspect is the solid oxide fuel cell according to any one of the seventh to tenth aspects, characterized in that the fuel cell includes a structure in which the fuel gas and the oxidant gas are supplied from central parts of the separators, respectively, to the fuel electrode layer and the oxidant electrode layer, respectively, through the fuel electrode current collector and the oxidant electrode current collector, respectively.

Additionally, the invention according to a twelfth aspect is a separator for use in a solid oxide fuel cell which is in contact with one of the current collectors arranged outside the respective electrodes to form a gas passage for supplying a gas to one of the electrode sections, characterized in that indents are provided on a surface of this separator, which surface is in contact with one of the current collectors, to increase a dwell volume of gas in the current collectors.

Additionally, the invention according to a thirteenth aspect is a separator for use in a solid oxide fuel cell which is contacted with each current collector arranged outside each electrode to form a gas passage for supplying a gas to each electrode section, characterized in that a peripheral part of a surface of the separator, which surface is in contact with the current collector, is protruded expandably to increase a linear velocity of gas in a peripheral part of the current collector.

Additionally, the invention according to a fourteenth aspect is a separator for use in a solid oxide fuel cell which is contacted with each current collector arranged outside each electrode to form a gas passage for supplying a gas to each electrode section, characterized in that indents are provided on a surface of the separator, which surface is in contact with the current collector, and a peripheral part of the surface concerned is protruded expandably.

Additionally, the invention according to a fifteenth aspect is the separator according to any one of the twelfth to fourteenth aspects, characterized in that a surface shape of the separator is formed at least on a surface in contact with one of the fuel electrode current collectors.

BRIEF DESCRIPTION OF THE DRAWINGS

FIG. 7 is an exploded perspective view of a relevant portion of the solid oxide fuel cell; and FIG. 8 is a sectional view of a relevant portion of a conventional fuel cell stack.

DETAILED DESCRIPTION OF THE PREFERRED EMBODIMENTS

Description will be made below of embodiments of the present invention with reference to the accompanying drawings. Incidentally, in the following description, for simplification of description, the same reference symbols are used for portions common to conventional portions.

First Embodiment

Description will be made below of a first embodiment of the present invention with reference to FIG. 1, FIG. 2a to FIG. 2b, and FIG. 3; initially, on the basis of FIG. 1, description will be made on a configuration of a solid oxide fuel cell involved in the present embodiment.

Figure 1:
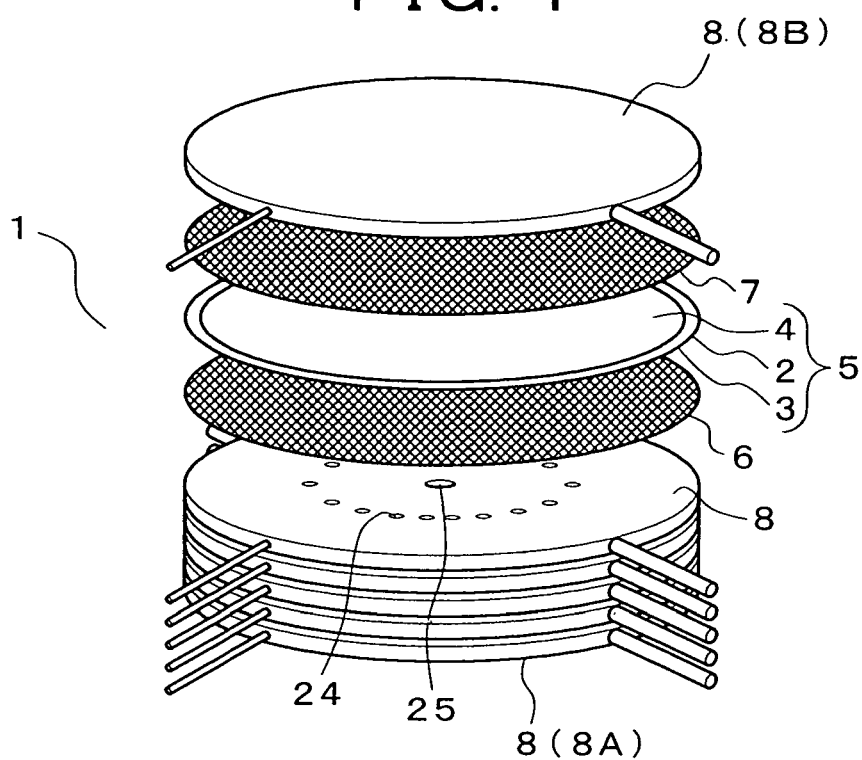
FIG. 1 is an exploded oblique perspective view illustrating a configuration of a relevant portion of a planar solid oxide fuel cell involved in the present invention.

In FIG. 1, reference numeral 1 denotes a fuel cell stack, which has a structure in which an electric power generation cell 5, in which a fuel electrode layer 3 and an air electrode layer (oxidant electrode layer) 4 are arranged respectively on both surfaces of a solid electrolyte layer 2, a fuel electrode current collector 6 arranged outside the fuel electrode layer 3, an air electrode current collector (oxidant electrode current collector) 7 arranged outside the air electrode layer 4, and separators 8 arranged respectively outside the current collectors 6 and 7 are laminated in this order. The present embodiment is suitably applicable to a sealless structure in which no gas seal is present along a rim of a fuel electrode current collector.

Here, the solid electrolyte layer 2 is formed of a stabilized zirconia (YSZ) that is added with yttria and the like, the fuel electrode layer 3 is formed of a metal such as Ni or Co, or a cermet such as Ni—YSZ or Co—YSZ, the air electrode layer 4 is formed of $LaMnO_3$, $LaCoO_3$ or the like, the fuel electrode current collector 6 is formed of a spongy porous sintered metal plate made of a Ni based alloy or the like, and the air electrode current collector 7 is formed of a spongy porous sintered metal plate made of a Ag based alloy or the like.

The separators 8 have a function to connect electrically between electric power generation cells 5 similarly to conventional separators, and also have a function to supply a gas to the electric power generation cells 5; however, a structure of the separators is different from a structure of conventional separators shown in FIG. 8.

Figure 2A:
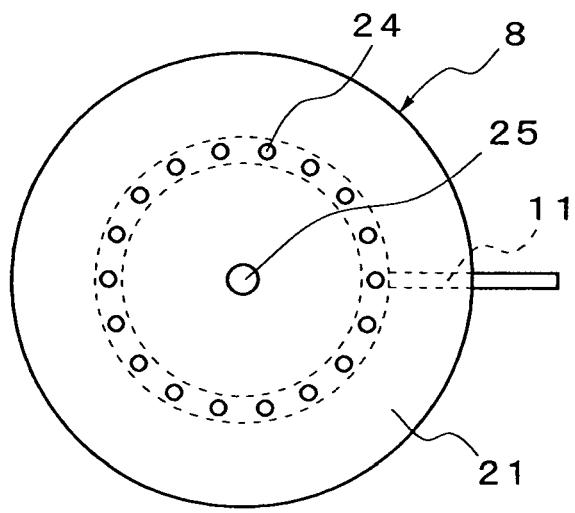
FIG. 2a and FIG. 2b illustrate a structure of a separator on a side of a fuel electrode involved in the present invention; with FIG. 2a being a related plan view and FIG. 2b being a related sectional view.
Figure 2B:
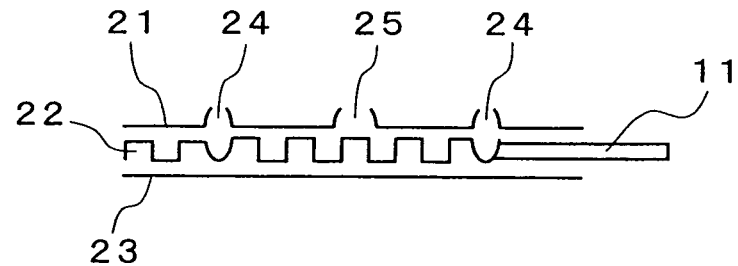

More specifically, a conventional separator is fabricated of a thick, single metal plate, whereas as shown in FIG. 2a and FIG. 2b, separator 8 of the present embodiment has a three layer structure which is formed by successively laminating a metal upper plate 21 provided with a plurality of gas discharge openings, an intermediate plate 22 processed to have a surface with alternate convexities and concavities, and a flat lower plate 23. For all these plates, thin metal plates made of stainless steel or the like are used.

In the upper plate 21, a first fuel gas discharge opening 25 is formed in a central part thereof, and a plurality of second fuel gas discharge openings 24 are formed in a circularly aligned manner. Fuel gas introduced from a rim face of the separator 8 is discharged, through a fuel gas passage 11, from these gas discharge openings 24 and 25, and supplied to the fuel electrode current collector 6 facing the separator 8.

For the intermediate plate 22, there is used a sheet metal material processed so as to have a surface with alternate convexities and concavities for a purpose of ensuring strength and a thickness as a separator. This plate is combined with the upper plate 21 and the lower plate 23 to form a hollow separator 8 as shown in FIG. 2b. Hollow portions formed by these convexities and concavities function as a gas flow path allowing fuel gas to diffuse easily, and simultaneously a weight savings of the separator 8 can be actualized.

Incidentally, a worked indented surface can be formed by performing plastic working on this sheet metal. In contrast to a rectangular shape shown in FIG. 2b, a corrugated shape (corrugated plate) may also be used. Additionally, a plate material provided with worked indented surface patterns by performing embossing processing may also be used.

The lower plate 23 forms a partition wall between a fuel electrode section and an air electrode section. The above described combination of the upper plate 21 and the intermediate plate 22 constitutes a separator structure on a fuel electrode side. In practice, a separator portion on an air electrode side is formed with an intervening lower plate 23, but in the figure concerned, a relevant portion is omitted.

Incidentally, the separators 8 (8A, 8B) at both ends of the fuel cell stack 1 shown in FIG. 1 have respectively either one of the above described separator structures on the fuel electrode side and the air electrode side.

In the above described configuration of the planar solid oxide fuel cell, fuel gas discharged from a central part and a peripheral part of the separator 8 can be spread over an entire area of the fuel electrode layer 3 with a satisfactory distribution through the fuel electrode current collector 6. Accordingly, gas reaction can be performed efficiently over the entire area of the electrode layer.

Figure 3:
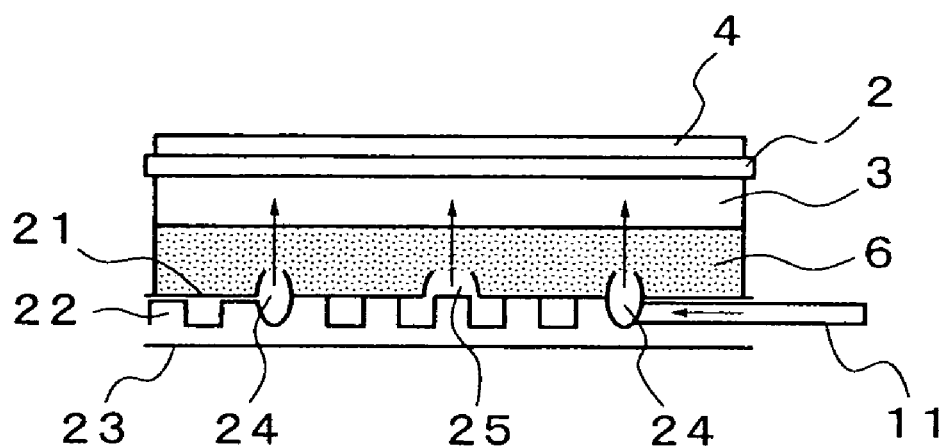
FIG. 3 is a sectional view of a relevant portion of a fuel cell stack involved in the present invention.

More specifically, a conventional type separator, provided with gas discharge opening 25 merely in a central part of the separator 8 shown in FIG. 8, has a structure such that gas can be hardly spread to a peripheral part, and accordingly, an electrode reaction is not spatially uniform, so that there have been caused problems including breakdown of an electric power generation cell and degradation of electric power generation efficiency due to thermal stress; however, according to the separator structure of the present embodiment, as shown in FIG. 3, fuel gas introduced from a peripheral face of the separator through the fuel path 11 is made to diffuse over an entire area of the separator by taking advantage of the hollow portions (convexities and concavities) of the separator 8 as the gas passage. The fuel gas is discharged from the first fuel gas discharge opening 25 in the central part and the a plurality of second fuel gas discharge openings 24 in the peripheral part, and the fuel gas can be spread over the entire area of the fuel electrode layer 3 with a satisfactory distribution through the fuel electrode current collector 6 facing the separator. Consequently, an electrode reaction comes to be performed uniformly over entire electrode areas, and hence electric power generation can be performed efficiently with a vanishing difference in electricity production between the central part and the peripheral part.

Moreover, the separator 8 of the present embodiment is made to have a laminate structure with a hollow interior, and hence a weight of the separator itself can be drastically reduced as compared to the conventional type separator. Such a structure is extremely effective in a fuel cell module having a structure in which a large number of cell stacks are longitudinally laminated, in view of the fact that a burden loaded on electric power generation cells located in lower positions is reduced. Consequently, a supporting frame for the fuel cell module can be simplified, and a constraint imposed on a number of laminations in a cell stack can be alleviated. Thus, an electric power generation of high electromotive force can be actualized.

As described above, as for the present embodiment, description has been made on the structure of the separator part in contact with the fuel electrode current collector 6, and a similar structure can be applied to the separator part in contact with the air electrode current collector 7. Additionally, some simple discharge structure other than those described above (for example, as shown in FIG. 7, a gas discharge structure restricted to the central part) can be adopted. Nonuniformity of electrode reaction in an interior of the current collectors is conspicuous around portions where supplied fuel gas enters, and accordingly, it is important to apply the structure of the present embodiment at least to the separator part facing the fuel electrode current collector 6.

Additionally, in the present embodiment, the separator 8 has a three layer structure formed of three thin metal plates; however, the separator structure is not restricted to this structure, and may take a two layer structure in which the lower plate 23 is omitted. In this way, a further weight savings of the separator 8 can be expected.

Additionally, in the present embodiment, there is presented a solid oxide fuel cell in which a stabilized zirconia (YSZ) that is added with yttria is used for an electrolyte in the electric power generation cell; however, the present invention can be applied to other solid oxide fuel cells such as those solid oxide fuel cells in which a ceria based electrolyte and a gallate based electrolyte are used.

Second Embodiment

Figure 4:
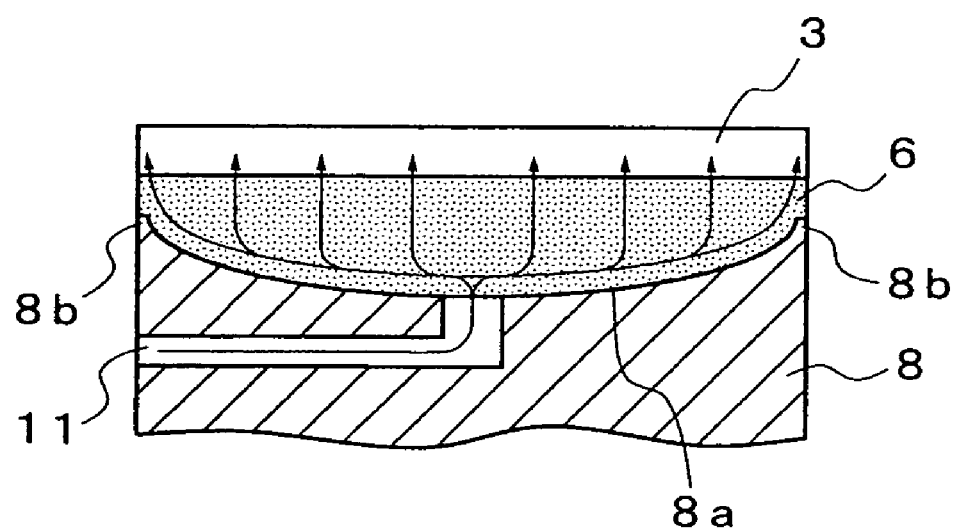
FIG. 4 is a sectional view of a relevant portion of a fuel cell stack illustrating a shape of a separator according to a second embodiment of the present invention.
Figure 5A:
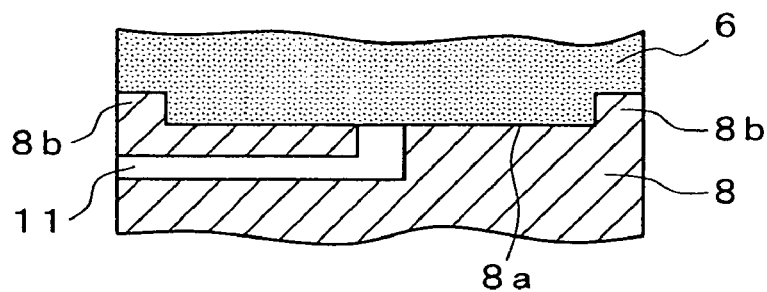
FIG. 5a to FIG. 5d are sectional views illustrating shapes of separators different from a shape shown in FIG. 1.
Figure 5B:
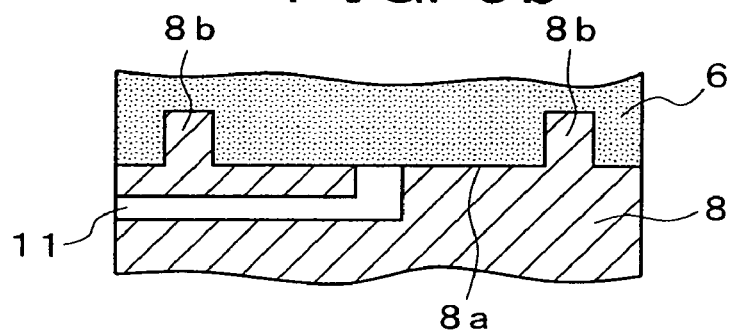
Figure 5C:
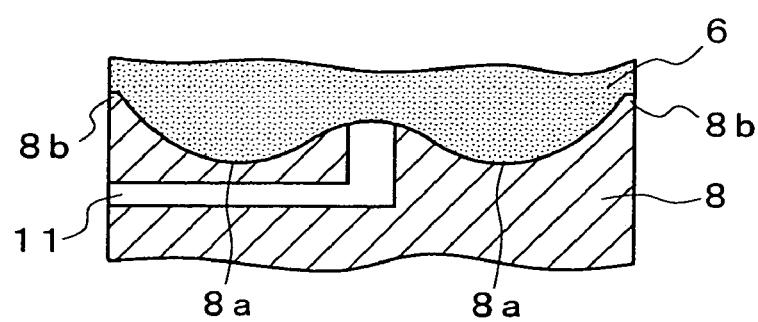
Figure 5D:
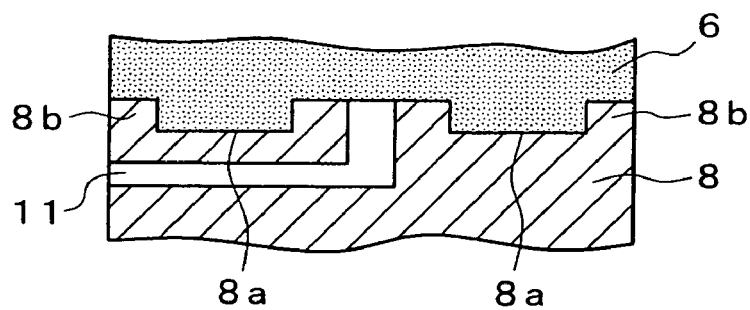

Now, description will be made below of a second embodiment of the present invention. FIG. 4 shows a sectional view of a relevant portion of a fuel cell stack illustrating a shape of a separator, FIG. 5*a* to FIG. 5*d* show sectional views of relevant portions illustrating other examples of separators, FIG. 6 shows an exploded sectional view of a solid oxide fuel cell, and FIG. 7 shows an exploded oblique perspective view of a relevant portion of the same solid oxide fuel cell in the present embodiment.

Initially, on the basis of FIG. 6 and FIG. 7, description will be made below of a configuration of the solid oxide fuel cell involved in the present embodiment.

Figure 6:
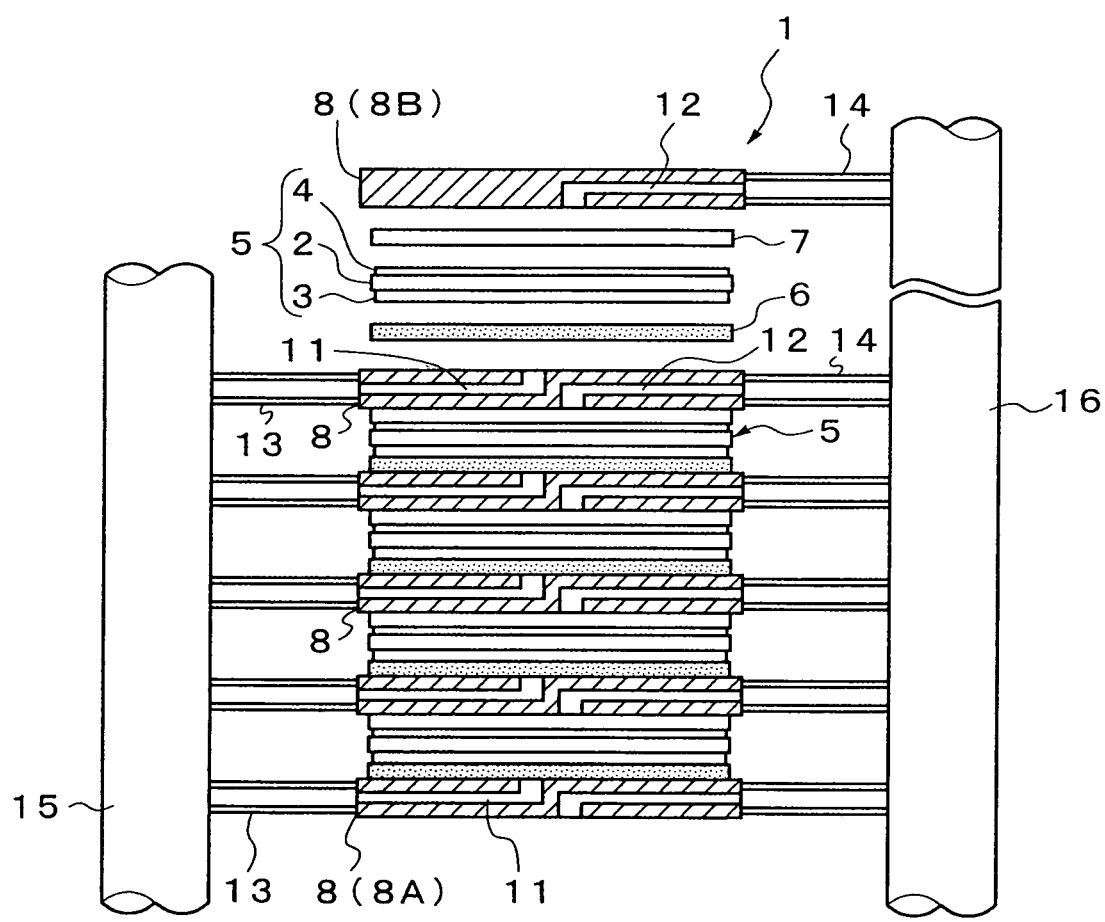
FIG. 6 is an exploded sectional view of a solid oxide fuel cell.

In FIG. 6, reference numeral 1 denotes a fuel cell stack, which has a structure in which an electric power generation cell 5 in which a fuel electrode layer 3 and an air electrode layer (oxidant electrode layer) 4 are arranged respectively on both surfaces of a solid electrolyte layer 2, a fuel electrode current collector 6 arranged outside the fuel electrode layer 3, an air electrode current collector (oxidant electrode current collector) 7 arranged outside the air electrode layer 4, and separators 8 arranged respectively outside the current collectors 6 and 7 are laminated in this order.

The solid electrolyte layer 2 is formed of a stabilized zirconia (YSZ) that is added with yttria and the like, the fuel electrode layer 3 is formed of a metal such as Ni or Co, or a cermet such as Ni—YSZ or Co—YSZ, the air electrode layer 4 is formed of $LaMnO_3$, $LaCoO_3$ or the like, the fuel electrode current collector 6 is formed of a spongy porous sintered metal plate made of a Ni based alloy or the like, the air electrode current collector 7 is formed of a spongy porous sintered metal plate made of a Ag based alloy or the like, and the separators 8 are formed of a stainless steel or the like.

Here, the porous metal plates forming the current collectors 6 and 7 are plates having been fabricated through performance of the following steps. The order of the steps is as follows: a step for preparing a slurry→a step for molding→a step for foaming→a step for drying→a step for degreasing→a step for sintering.

Initially, in the step for preparing a slurry, a metal powder, an organic solvent (n-hexane or the like), a surfactant (sodium dodecylbenzenesulfonate or the like), a water soluble resin binder (hydroxypropylmethyl cellulose or the like), a plasticizer (glycerin or the like) and water are mixed together, and thus a foaming slurry is prepared. In the step for molding, by use of a doctor blade method, the slurry is molded in a thin plate shape on a carrier sheet, and thus a green sheet is obtained. Then, in the step for foaming, this green sheet is foamed into a spongy condition in a high temperature and high humidity environment with aid of vapor pressure of a volatile organic solvent and a foaming property of the surfactant. Subsequently, a porous metal plate is obtained through the step for drying, the step for degreasing and the step for sintering.

In this case, in the step for foaming, bubbles generated in the green sheet grow with nearly spherical shapes as a result of receiving nearly equivalent pressures along all directions. When a bubble diffuses to approach an interface with an atmosphere, the bubble grows toward a thin part of the slurry interposed between the bubble and the atmosphere, and eventually the bubble is broken and gas inside the bubble diffuses into the atmosphere through formed small holes. Accordingly, there is obtained a porous metal plate provided with continuous pores having openings on its surface. The current collectors 6 and 7 each are formed by cutting a thus fabricated porous metal plate having a three dimensional skeleton structure, into a circular form.

On the other hand, as shown in FIG. 6 and FIG. 7, the separators 8 electrically connect between electric power generation cells 5, and also have a function to supply gas to the electric power generation cells 5. Therefore, each separator has a fuel path 11 through which fuel gas is introduced from a peripheral side of the separator 8 and is discharged from an approximately central part of a surface of the separator 8 facing the fuel electrode current collector 6, and an oxidant path 12 through which oxidant gas is introduced from the peripheral side of the separator 8 and is discharged from a separator surface facing the air electrode current collector 7. Here, it should be noted that the separators 8 (8A, 8B) at both ends of the stack have respectively either one of the paths 11 and 12.

Additionally, the separator 8 of the present embodiment is different from a flat shaped conventional type shown in FIG. 8 in that a surface of the separator 8 in contact with the fuel electrode current collector 6 is made to be bowl shaped, as shown in FIG. 4, by providing a depression 8a with a deepened central part, and consequently, a situation is such that peripheral part 8b is raised. As has already been described, material for the fuel electrode current collector 6 itself is formed of a spongy foam, and hence, at a time of lamination, the foam is arranged in a condition such that the foam is in close contact with a depression shape of the separator 8. Therefore, as far as the separator 8 shown in FIG. 4 is used, the fuel electrode current collector 6 is made to have a shape in which a central part of the collector is swollen as compared to a conventional collector (for example, if a thickness of a conventional fuel electrode current collector 6 is about 0.75 mm, a maximum thickness of the central part is made to increase on the order of about 1.5 mm the case of the present embodiment), and moreover, the peripheral part is made to be thinner as compared to a conventional type (for example, made to be on the order of 0.2 mm in relation to a thickness of 0.75 mm of the conventional type).

Additionally, as shown in FIG. 6, respectively on both sides of the fuel cell stack 1, a manifold 15 for fuel for supplying fuel gas through connecting pipes 13 to fuel paths 11 in respective separators 8, and a manifold 16 for oxidant for supplying oxidant gas through connecting pipes 14 to oxidant paths 12 in the respective separators 8, are arranged along a direction of lamination of the electric power generation cells 5 in an extended manner.

According to the above described configuration of the fuel cell, fuel gas discharged from the central part of the separators 8 is spread over an entire area of the fuel electrode layer 3 through the fuel electrode current collector 6 with a satisfactory distribution, and thus a satisfactory gas reaction can be performed over the entire area of the electrode layer.

More specifically, as shown in FIG. 8, in a conventional type having flat separators 8, fuel electrode current collectors 6 are also flat shaped, and in particular, a permeation rate of fuel gas (arrows in this figure) is high in a neighborhood of a central part of each of the fuel electrode current collectors 6 (in other words, a retaining time of gas in the current collector is short). Thus, an electrode reaction in the neighborhood of the central part of the electrode layer is not completely performed, and moreover, a situation is such that the gas is not sufficiently spread to a peripheral part, so that nonuniformity of the electrode reaction is caused, and there is a possibility such that most of the fuel gas not engaged in the reaction is vainly discharged outside the electric power generation cell.

On the contrary, use of the separators 8 shown in FIG. 4 increases a volume of the fuel electrode current collectors 6 themselves, so that if a supplied amount of gas from the separators 8 is constant, a permeation rate of the gas is thereby made lower and a retaining time of the gas in the current collectors can be made longer. Consequently, gas discharged from the central part of each of the separators 8 can be made to permeate a wide area from the central part to the peripheral part of the fuel electrode current collector 6, and the fuel gas can thereby be supplied to the fuel electrode layer 3 in a uniformly distributed manner, so that a satisfactory gas reaction can be performed over the entire area of the electrode layer.

Additionally, in each of the separators 8 of the present embodiment, the peripheral part is protruded expandably, and a thickness of the peripheral part of the fuel electrode current collector 6 thereby comes to be thinner than a corresponding thickness of the conventional type. Therefore, particularly in a case of a sealless structure (a type in which a rim of the fuel electrode current collector has no gas seal), a linear velocity of gas being discharged is increased in the peripheral part of the fuel electrode current collector, and entrainment of air from the peripheral part is thereby prevented and a combustion reaction in an interior of the electric power generation cell can be inhibited, so that also in the peripheral part of the fuel electrode layer 3, there can be maintained a condition in which a fuel gas concentration is raised, and an improvement of electric power generation performance can thereby be expected.

As described above, as for the present embodiment, description has been made of a shape of the surface, in contact with fuel electrode current collector 6, of the separator 8. A shape of the surface, in contact with the air electrode current collector 7, of the separator 8 can be made to have a similar shape. Additionally, the shape of the surface of the separator 8 is not limited to the shape shown in FIG. 4, and various shapes as shown in FIG. 5a to FIG. 5d are conceivable. In these figures, reference numeral 8a denotes a depression located in a central part or in a neighborhood thereof similarly to the case described above, reference numeral 8b denotes a peripheral part raised along a periphery of the depression 8a. To sum up, acceptable is a shape in which a volume of the current collector can be made larger, and thickness of the peripheral part can be made small.

Additionally, as the porous structure of the current collectors 6 and 7, mesh, felt and the like can be used in addition to foam.

Additionally, in the present embodiment, there is presented a solid oxide fuel cell in which a stabilized zirconia (YSZ) that is added with yttria is used for the electrolyte in the electric power generation cell; however, the present invention can be applied to other solid oxide fuel cells such as those solid oxide fuel cells in which a ceria based electrolyte and a gallate based electrolyte are used.

INDUSTRIAL APPLICABILITY

<Effect of the First Embodiment>

As described above, according to the present invention set forth in the first and fourth aspects, gas discharge openings are provided in the central part and the peripheral part of a separator, so that gas can be sufficiently spread over an entire area of a current collector. Consequently, an electrode reaction can be performed uniformly over an entire area of the electrode, and thus an efficient electric power generation can be performed in which a difference in electricity production between the central part and the peripheral part of the electric power generation cell is eliminated.

Additionally, according to the present invention set forth in the second and the fifth aspects, the separators are made by laminating a plurality of thin metal plates including at least the thin metal plates each provided with a first gas discharge opening and second gas discharge openings, and thin metal plates having a worked indented surface. Consequently, the separators themselves are made light in weight, and a number of laminations of a cell stack in a longitudinal type fuel cell module can thereby be increased, so that an electric power generation of high electromotive force can be actualized. Additionally, convexities and concavities form the gas flow path, and hence introduced gas comes to be easily supplied to the entire area of the current collector, so that an efficient electric power generation can be actualized in which nonuniformity of an electrode reaction in the interior of the current collector is reduced.

Additionally, according to the present invention set forth in the third and sixth aspects, the above described separator structure according to the first and second aspects is applied at least to a separator part on the side of the fuel electrode current collector, so that a nonuniformity phenomenon of an electrode reaction in the interior of the fuel electrode current collector, which is conspicuous around portions where the supplied gas enters, can be effectively improved, and consequently an efficient electric power generation can be actualized in which a fuel utilization ratio is high.

<Effect of the Second Embodiment>

Additionally, according to the invention set forth in the seventh and twelfth aspects, indents are provided on the surface, in contact with one of the current collectors, of each of the separators, and accordingly, a dwell volume of gas in the interior of the current collectors is increased, and hence a retaining time of the gas is thereby made longer (a gas permeation rate is made lower). Consequently, the gas is slowly spread over a wide area through the current collector, a satisfactory gas reaction comes to be performed over the entire area of the electrode layer. Accordingly, a fuel utilization ratio and an air utilization ratio are increased, and electricity generation performance is improved.

Additionally, according to the invention set forth in the eighth and thirteenth aspects, the peripheral part of the surface, in contact with the current collector, of the separator is protruded expandably, and accordingly, a linear velocity of gas being discharged is raised in a peripheral part, entrainment of air from the peripheral part is prevented, and a combustion reaction in the interior of the electric power generation cell can be inhibited. Consequently, in the peripheral part of the fuel electrode layer, there can be formed a condition in which a fuel gas concentration is raised, and electric power generation performance is thereby improved.

Additionally, according to the invention set forth in the ninth and fourteenth aspects, indents are provided on the surface, in contact with the current collector, of the separator, and the peripheral part of the separator is protruded in an expanded manner. Therefore, effects set forth in the first and second aspects are obtained in which a permeation rate of gas in the interior of the current collector is made lower and an electrode reaction is made satisfactory; moreover, a linear velocity of gas being discharged in the peripheral part is made great, and entrainment of air from the peripheral part can be prevented.

Additionally, according to the invention set forth in the tenth and fifteenth aspects, the above described surface shape of the separator is made to be formed at least on the surface thereof in contact with the fuel electrode current collector, so that the phenomena of an incomplete reaction of the gas and the entrainment of air in the fuel electrode current collector are improved without failure, and hence electric power generation performance is improved.

Additionally, according to the invention set forth in the eleventh aspect, the structure is such that gases are supplied respectively from central parts of the separators to the fuel electrode layer and the oxidant electrode layer, respectively, through the fuel electrode current collector and the oxidant electrode current collector. Therefore, gases slowly permeate over wide areas from the central parts of the current collectors to the peripheral parts, and supplied to the electrode layers in a uniformly distributed manner, and satisfactory electrode reactions come to be performed over the entire areas of the electrode layers.

The invention claimed is:

1. An oxide fuel cell comprising:
a fuel electrode layer and an oxidant electrode layer on opposite surfaces of a solid electrolyte layer, respectively;
a porous fuel electrode current collector and a porous oxidant electrode current collector positioned outside said fuel electrode layer and said oxidant electrode layer, respectively;
a first separator, positioned outside said porous fuel electrode current collector, for allowing a fuel gas to be supplied from said first separator to said fuel electrode layer through said porous fuel electrode current collector, said first separator having a surface in contact with said porous fuel electrode current collector; and
a second separator, positioned outside said porous oxidant electrode current collector, for allowing an oxidant gas to be supplied from said second separator to said oxidant electrode layer through said porous oxidant electrode current collector, said second separator having a surface in contact with said porous oxidant electrode current collector,
wherein a peripheral part of said surface of said first separator protrudes towards a peripheral part of said porous fuel electrode current collector so that a thickness of said peripheral part of said porous fuel electrode current collector is smaller than a thickness of any other portion of said porous fuel electrode current collector to thereby increase a linear velocity of the fuel gas in said peripheral part of said porous fuel electrode current collector, and a peripheral part of said surface of said second separator protrudes towards a peripheral part of said porous oxidant electrode current collector so that a thickness of said peripheral part of said porous oxidant electrode current collector is smaller than a thickness of any other portion of said porous oxidant electrode current collector to thereby increase a linear velocity of the oxidant gas in a peripheral part of said porous oxidant electrode current collector.

2. The oxide fuel cell according to claim 1, wherein said first separator is for allowing a fuel gas to be supplied from said first separator to said fuel electrode layer through said porous fuel electrode current collector by allowing the fuel gas to be supplied from a central part of said first separator, through said porous fuel electrode current collector and to said fuel electrode layer, and said second separator is for allowing an oxidant gas to be supplied from said second separator to said oxidant electrode layer through said porous oxidant electrode current collector by allowing the oxidant gas to be supplied from a central part of said second separator, through said porous oxidant electrode current collector and to said oxidant electrode layer.

3. The oxide fuel cell according to claim 1, wherein each of said porous fuel electrode current collector and said porous oxidant electrode current collector is made from a spongy porous metal material.

* * * * *